¹United States Patent Office 2,881,325
Patented Apr. 7, 1959

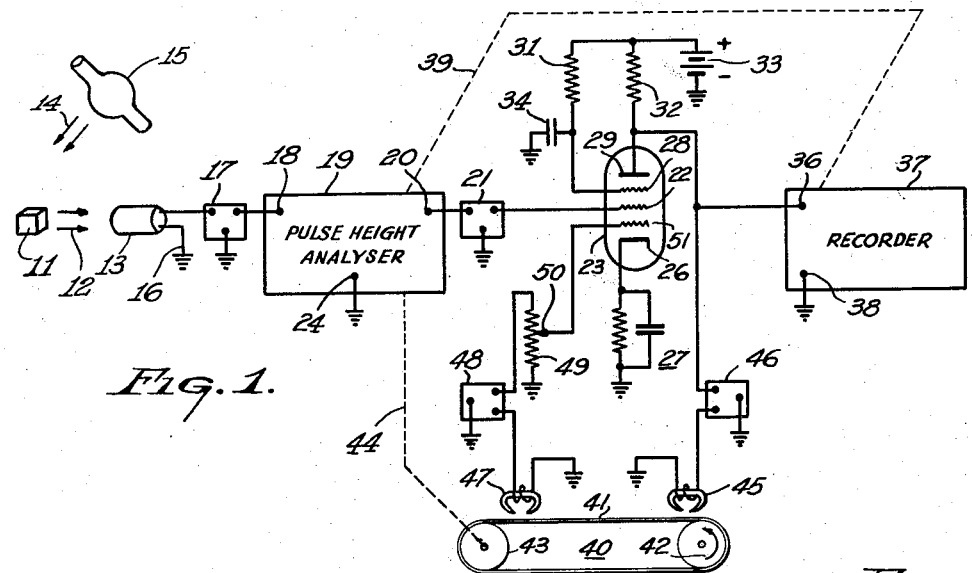

2,881,325

DEVICE FOR CHARTING X-RAY SPECTRA

Charles F. Hendee, Irvington, Samuel Fine, New York, and Walter B. Brown, White Plains, N.Y., assignors, by mesne assignments, to North American Philips Company, Inc., New York, N.Y., a corporation of Delaware Application June 16, 1954, Serial No. 437,074

16 Claims. (Cl. 250—83.3)

This invention relates to apparatus and methods for detecting and recording radiation, and particularly to such apparatus and methods which employ signals generated by radiation detector tubes or devices such as proportional counters, scintillation counters, or the like.

Radiation detector tubes produce electrical output pulses or signals in accordance with, or in response to, radiation which impinges thereon. For a given type and magnitude of radiation, certain detector tubes will produce aperiodic output pulses, some of which are in the form of "main" pulses and the remaining of which are in the form of "escape" pulses. The main output pulses represent the energy level or magnitude of the type of radiation being detected. The escape pulses, which occur in lieu of main pulses, are accompanied by an escape or release of radiation in the form of fluorescent photons, or X-rays or the like, from the gas in the detector tube. The escape pulses usually have voltage amplitudes less than that of the main pulses.

It is common practice to connect the output of a radiation detector tube to a pulse-height analyzer, the output signal of which represents the numbers of pulses having different amplitudes or energy levels. The output signal of such a pulse-height analyzer, when integrated, comprises a main peak signal and an escape peak signal for each type of detected radiation. The magnitudes of the peak signals represent the numbers of main pulses and escape pulses which are produced by the radiation detector tube. The shapes of the peak signals represent the amplitude distribution of the main pulses and escape pulses.

Because two types of output signals, viz., main peak signals and escape peak signals, are produced as described above for each type of incident radiation, it is often difficult or impossible to obtain accurate results or to distinguish between the types of radiation being detected. These difficulties have been pointed out in detail by West et al., in the Philosophical Magazine, Ser. 7, vol. XLIII, August 1952, at the bottom of page 881 and on page 882. Usually it is desired to make use of only the main peak signals, and occasionally it is desired to make use of only the escape peak signals. These signals are useful, for example, in determining the composition of a material.

An object of the present invention is to provide an improved method and apparatus for detecting and recording radiation.

Another object is to provide a method and apparatus for removing undesired signals.

A further object is to provide a method and apparatus for detecting and recording radiation, which is more accurate and reliable than such methods and apparatus heretofore.

Still other objects will be apparent.

The invention functions to remove an undesired part, such as, for example, the escape peak signal, of the integrated output signal of a pulse-height analyzer to which a radiation detector tube is connected. The output signal of the pulse-height analyzer usually is fed to a circuit which is connected to a recorder or other indicating device. In accordance with the invention, a fraction of the main peak signal, or a signal characteristic thereof, is combined with the escape peak signal in reverse polarity with respect thereto, whereby the escape peak signal becomes substantially or completely canceled out and only the main peak signal reaches the recorder. Alternatively, in a like manner, the main peak signal may be removed, by combining a fraction of the escape peak signal, or a signal characteristic thereof, with the main peak signal in reverse polarity with respect thereto, whereby only the escape peak signal reaches the recorder. It is to be understood that the above-mentioned fractions may be either greater or less than unity.

Referring to the drawing:

Fig. 1 is a schematic diagram of an apparatus according to the invention in which a single-channel pulse-height analyzer is used;

Fig. 2 is a graph showing the electrical signals which occur in the apparatus of Fig. 1;

Fig. 3 is a schematic diagram of an apparatus according to another embodiment of the invention in which a multi-channel pulse-height analyzer is used; and Fig. 4 is a graph showing the electrical signals which occur in the apparatus of Fig. 3.

Referring to Fig. 1, a source 11 of radiation 12 is positioned so that the radiation 12 will impinge upon and be detected by a radiation detector tube 13. The radiation 12 may comprise electromagnetic radiation, or radiation in the form of energetic particles, or the like. The radiation source 11 may comprise a material to be analyzed, which is bombarded by X-rays or other energy 14 produced by a suitable source 15. The detector tube 13, in its more usual form, comprises an outer cylindrical conductor electrode and an inner rod-like conductor electrode, these electrodes being in a gas-filled enclosure. Suitable operating potentials, not shown, are connected to the electrodes. One of the electrodes is connected to electrical ground, as indicated at 16. The remaining electrode is connected or coupled through an amplifier 17 to a signal input terminal 18 of a pulse-height analyzer 19.

A signal output terminal 20 of the pulse-height analyzer 19 is connected through a signal integrator 21 to a control electrode 22 of a signal-mixing tube 23, and a remaining common signal terminal 24 is connected to electrical ground. A cathode 26 of the tube 23 is connected to electrical ground through a biasing impedance 27. A screen grid 28 and an output electrode or anode 29 are connected respectively, through resistances 31 and 32 to a terminal of a source 33 of voltage, the remaining terminal of the source 33 being connected to electrical ground. A by-pass condenser 34 is connected between the screen grid 28 and electrical ground. A signal input terminal 36 of a signal utilization device 37, such as a recorder or other indicating device, is connected to the anode 29, and a remaining signal terminal 38 is connected to electrical ground. The device 37 preferably is mechanically or otherwise synchronized with the pulse-height analyzer 19, as indicated by the dashed line 39.

A memory device 40, which may comprise a magnetic or other recording tape or medium 41, is driven, in the direction indicated at 42, by a capstan 43, preferably synchronized with the pulse-height analyzer 19 as indicated by the dashed line 44. A recording head 45 is positioned to record signals on the medium 41, and is connected electrically, along with a recording modulation circuit 46, between the output electrode 29 and electrical ground. A pick-up head 47 is positioned to receive signals recorded on the medium 41 by the recording head 45, and is connected, along with a suitable signal demodulator 48, between electrical ground and an end of a potentiometer gain control 49, the remaining end of which is connected to electrical ground. An adjustable tap 50 on the gain control 49 is connected to a control electrode 51 in the mixer tube 23. An erase magnet or device 52 is positioned near the medium 41 to erase the signals after they have been received by the pick-up head 47.

The embodiment of Fig. 1 operates as follows: The multiple-pulse output signal of the pulse-height analyzer 19, for a given type of radiation 12, after being integrated by the integrator 21, is shown by the solid-line curve 56 in Fig. 2, in which the abscissa represents the amplitudes or heights of pulse signals produced by the radiation detector tube 13, and the ordinate represents the numbers of pulses having the various amplitudes. The signal 56 comprises, for any single type of radiation 12, a main peak signal 57 and an escape peak signal 58. The peak signals 57 and 58 represent the distribution of amplitudes of the main pulses and escape pulses, respectively, which are produced by the radiation detector tube 13, and usually are shaped like typical statistical distribution curves. The integrator 21 functions to convert the output pulses of the analyzer 19 into the smooth curve 56. The magnitude and position of the escape peak signal 58 with respect to the main peak signal 57, is always substantially the same for any given type of radiation 12. The various parts of the signal 56 occur and may be recorded in a time sequence, due to a well-known scanning action of the pulse-height analyzer 19.

In the preferred embodiment of the invention, the scanning sequence of the pulse-height analyzer 19 is from a high energy level to a low energy level, as indicated in Fig. 2, so that the main peak signal 57 occurs before the escape peak signal 58 occurs. At the time the main peak signal 57 occurs, it is amplified by the mixer tube 23 and fed to the recorder 37, where it may be recorded on paper or on film or the like. The amplified main peak signal 57 also is recorded, via the recording head 45, on the tape 41. The movement of the tape 41 is so synchronized with the scanning action of the pulse-height analyzer 19, that a delayed main peak signal is received from the tape 41 by the pick-up head 47 during the time the escape peak signal 58 appears at the control electrode 22.

The delayed main peak signal is reversed in polarity with respect to the escape peak signal 58, which may be achieved in the amplifier tube 23, or due to polarity-reversing connections in the delay device 40, or otherwise, and is adjusted in amplitude by proper setting of the gain control 49 so as to appear at the control electrode 51 in a manner indicated at 61, to completely or substantially cancel out the escape peak signal 58, as indicated at 62. The escape peak signal 58 will not enter the delay device 40 because it is canceled out before reaching the output electrode 29 to which the recording head 45 is connected. Thus, only the main peak signal 57 is recorded by the recorder 37, and one or more other main peak signals 63 produced in response to radiation 12, which may occur at an amplitude level near that of the escape peak signal 58, will be recorded properly by the recorder 37 and will not be distorted by the unwanted escape peak signal 58. The escape peak signal associated with the main peak signal 63, may be canceled out in the manner described above; however, it may be necessary to reset the delay device 40, during a recording run, if the spacing and relative size of the last-named escape peak, with respect to the main peak 63, is different from the corresponding spacing and relative size of the escape peak 58 with respect to the main peak 57.

The required amount of time delay in the delay device 40, and the setting of the gain control 49, will depend on the kind of gas employed in the counter tube 13. For example, a relatively heavier type of gas, such as xenon, will require a longer time delay in the delay device 40 and also a higher-gain setting of the gain control 49. The proper settings for time delay and gain can be pre-calibrated, since it is known, for various gases which may be used in the counter tube 13, what the spacing and relative counting rate or number of pulses per peak of the escape peak signal 58 will be with respect to that of the main peak signal 57.

It will be appreciated that, in accordance with the invention, an accurate analysis may be made of a simultaneous plurality of different types of radiation 12, due to the fact that only the main peak signals are recorded. Although it usually is preferable to record only the main peak signals, the above process may be reversed in time sequence, if desired, so that only the escape peak signals 58 will be recorded by the recorder 37. Cancellation of the unwanted peak signals is usually complete; however, even though the cancellation may not always be complete, it can be made substantially complete so as to provide greatly improved accuracy in observing and interpreting the information provided by the radiation detector tube 13.

The memory device 40 may comprise a recording and play-back device as described above, or may comprise a delay line, a signal-reflecting line having inherent phase reversal, or other signal-delaying device. In lieu of delaying the actual pulses, a delay device 40 can be used which produces a new pulse delayed with respect to the incoming pulse. When a recording and play-back device is employed as described above, the amount of delay is conveniently adjustable by varying the spacing, along the recording medium 41, between the recording head 45 and pick-up head 47. Any necessary A.-C. biasing may be applied in the recording modulation circuit 46 of the delay device 40 in the well-known manner. In the embodiment described above, it is to be understood that the pulse-height analyzer 19 may include any necessary amplifiers 17 or integrators 21. Furthermore, it is contemplated that any necessary signal amplifiers may be employed where necessary, such as in the connections to the memory device 40. The signal-mixing device 23 preferably comprises a multi control element tube as has been described, due to the signal isolation advantages thereof. However, the direct signal and delayed signal may be mixed and canceled out directly in the recorder 37, if desired, or in any other suitable manner.

Now referring to the alternative embodiment of the invention shown in Fig. 3, there is provided a multi-channel pulse-height analyzer 71 which comprises, by way of example, ten individual channels, numbered 1 through 10 on the drawing. The channel widths, i.e., the range of pulse amplitudes which are passed by a channel, need not necessarily be equal for all of the channels. The output terminals of the radiation detector tube 13 are coupled through the amplifier 17 to input terminals 18' of each channel, as shown. The output terminals 20' of each channel are respectively connected to a utilization device 37', which may comprise individual signal recorders numbered 1–10 on the drawing. These individual recorders may comprise meters or counters, or the like. Channel 10 of the multi-channel pulse-height analyzer 71 passes only the pulses having relatively high energy levels; channel 1 passes only pulses having relatively low energy levels; and the intermediate channels pass only pulses having varying intermediate energy levels, as is indicated by the abscissa of the graph shown in Fig. 4. If desired, integrators similar to the integrator 21 in Fig. 1 may be connected respectively to the output terminals 20' of the analyzer 71, for the purpose of averaging the pulse-count output signals with respect to time.

A potentiometer gain control 72 is connected across the signal output terminals 21', 24' of channel 10 of the analyzer 71, and the adjustable tap 73 of the gain control 72 is connected through a phase-reversing device 74 to the input terminal 76 of indicator device 5. A unidirectional signal-conducting device 75, such as a rectifier, may be included in this connection to prevent signal feed-back. The phase-reversing device 74 may comprise a transformer, or an amplifier tube or other suitable phase-reversing device. If an amplifier tube is used, there is inherent unilateral signal conduction, and the device 75 is not necessary. Similarly, gain controls 77, 78, 79 and 80 are connected across the output terminals of analyzer channels 9, 8, 7 and 6 repectively, and the adjustable taps 81, 82, 83 and 84 of these gain controls are connected through phase-reversing devices 86, 87, 88 and 89 to the input terminals of indicator 37' for channels 4, 3, 2 and 1 respectively.

In the embodiment of Fig. 3, the output signals of the pulse-height analyzer 71, which represent the numbers of pulses of various amplitude levels, are recorded simultaneously. By proper adjustment of the gain control devices 72, 77, 78, 79 and 80, and by proper distribution of the analyzer channels, various portions of the main peak signal 57' are combined out-of-phase with the corresponding portions of the escape peak signal 58', as is indicated by the dashed lines 91 in Fig. 4, whereby the escape peak signal 58' becomes substantially canceled out, as is indicated at 62'.

While preferred embodiments of the invention have been shown and described, various modifications thereof will appear to those skilled in the art, which modifications will fall within the scope of the invention as defined in the following claims:

What is claimed is:

1. Apparatus for removing undesired signals and retaining desired signals, comprising a means for producing said desired signals and undesired signals, a signal utilization means, and an electrical connection between said first-named means and said utilization means comprising means connected to feed said desired signals to said utilization means, and a signal-cancellation means responsive to said signals and connected to combine said desired signals with said undesired signals thereby to effect substantial cancellation of said undesired signals in response to the occurrence of said desired signals, whereby only said desired signals are received by said utilization means.

2. Apparatus for removing undesired signals and retaining desired signals, comprising a means for producing said desired signals and undesired signals, a signal utilization means, and an electrical connection between said first-named means and said utilization means comprising means connected to feed said desired signals to said utilization means, and a signal-mixing means connected to combine said desired signals with said undesired signals in reversed polarity with respect thereto, whereby said undesired signals are substantially canceled out and only said desired signals are received by said utilization means.

3. Apparatus for removing an undesired signal and retaining a desired signal, comprising a means for producing said desired signal and undesired signal, utilization means connected to receive signals produced by said first-named means, a polarity reversing means connected to receive said desired signal, and a signal-mixing means connected to combine the signal reversed in polarity by said polarity-reversing means with said undesired signal, whereby said undesired signal is substantially canceled out and only said desired signal is received by said utilization means.

4. The apparatus in accordance with claim 3, in which said desired signal occurs at a time prior to said undesired signal, and including means connected to delay said polarity-reversed desired signal, whereby the delayed desired signal occurs in time synchronism with said undesired signal.

5. The apparatus in accordance with claim 3, in which said means for producing said signals comprises a plurality of signal channels, said desired signal emanating from a first one of said channels and said undesired signal emanating from another of said channels, and in which said signal-mixing means comprises an electrical connection between said polarity-reversing means and said other channel.

6. The apparatus in accordance with claim 5, including a unidirectional signal conducting device connected in series with said electrical connection, whereby said undesired signal is prevented from reaching said first channel.

7. Apparatus for detecting and recording radiation, comprising a radiation detector tube which produces main pulses and escape pulses in response to said radiation, a pulse-height analyer connected to receive said pulses and which produces at an output terminal thereof a main peak signal followed in time sequence by an escape peak signal, a signal recording device, a signal-mixing device having an input terminal connected to receive said peak signals and having an output terminal connected to said signal recording device, a circuit comprising a signal delay device having an input terminal connected to receive said main peak signal and having an output terminal connected to an input terminal of said signal-mixing device, and a polarity-reversing means connected in said circuit, whereby said escape peak signal is substantially canceled out by the delayed main peak signal and only said main peak signal is recorded by said recording device.

8. The apparatus in accordance with claim 7, including a signal gain control device connected in said circuit to control the relative amplitudes of said delayed main peak signal and said escape peak signal.

9. Apparatus for detecting and recording radiation, comprising a radiation detector tube which produces main pulses and escape pulses in response to said radiation, said pulses having different energy levels, a plurality of pulse-height analyzer channels connected in parallel to receive said pulses, at least one of said channels being capable of transmitting to an output terminal thereof only pulses having an energy level in the energy region of said main pulses, at least one other of said channels being capable of transmitting to an output terminal thereof only pulses having an energy level in the energy region of said escape pulses, signal recording devices connected respectively to the output terminals of said analyzer channels, and a signal-transferring means connected between said output terminals to combine said main pulses with said escape pulses in reversed phase, whereby said escape pulses are substantially canceled out and only said main pulses are recorded.

10. The apparatus in accordance with claim 9, including a signal gain control device connected in said signal-transferring means to control the relative amplitudes of said combined main pulses and escape pulses.

11. The apparatus in accordance with claim 9, including a unidirectional signal conducting device connected in series with said signal-transferring means, whereby said escape pulses are prevented from reaching said one channel.

12. A method for removing an undesired signal in the presence of a desired signal, comprising the steps of reversing the polarity of one of said signals and combining the reversed-polarity signal with the other signal.

13. A method for removing an undesired signal in the presence of a desired signal, comprising the steps of reversing the polarity of said desired signal, adjusting the amplitude of the reversed-polarity signal to equal the amplitude of said undesired signal, and combining the amplitude-adjusted signal with said undesired signal.

14. A method for removing an undesired signal which occurs following a desired signal, comprising the steps of delaying said desired signal, reversing the polarity of the delayed desired signal, and combining the reversed-polarity delayed signal with said undesired signal.

15. A method for removing an undesired signal which occurs simultaneously with a desired signal, comprising the steps of reversing the polarity of said desired signal and combining the polarity-reversed signal with said undesired signal.

16. A method for removing an undesired signal from a circuit containing also a desired signal comprising the steps of feeding the desired signal to a delaying device, delaying the desired signal to bring it into phase with the undesired signal, reversing the polarity of the desired signal, adjusting the amplitude of the desired signal to correspond to that of the undesired signal, and feeding the so-produced signal into said circuit.

References Cited in the file of this patent

UNITED STATES PATENTS

| | | |
|---|---|---|
| 2,648,012 | Scherbatskoy | Aug. 4, 1953 |
| 2,659,012 | Bromberg et al. | Nov. 10, 1953 |
| 2,685,027 | Alvarez | July 27, 1954 |
| 2,686,266 | Pringle et al. | Aug. 10, 1954 |